Aug. 26, 1952  J. M. COCHRAN  2,608,653
ELECTRONIC LOW-ENERGY RELAY APPARATUS
Filed Feb. 25, 1950
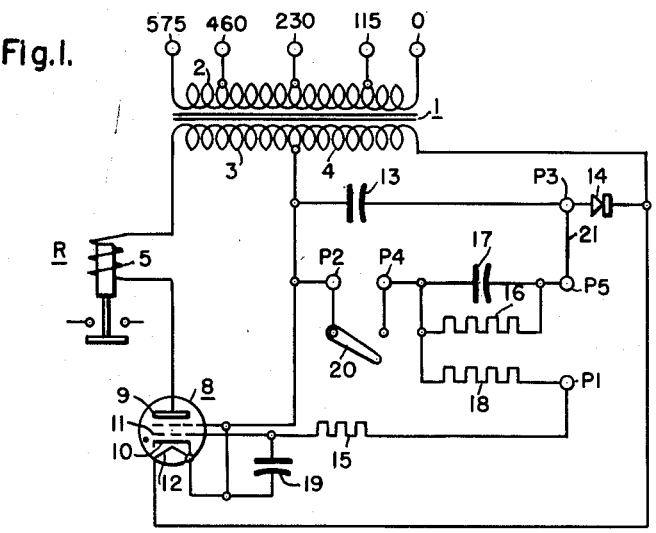
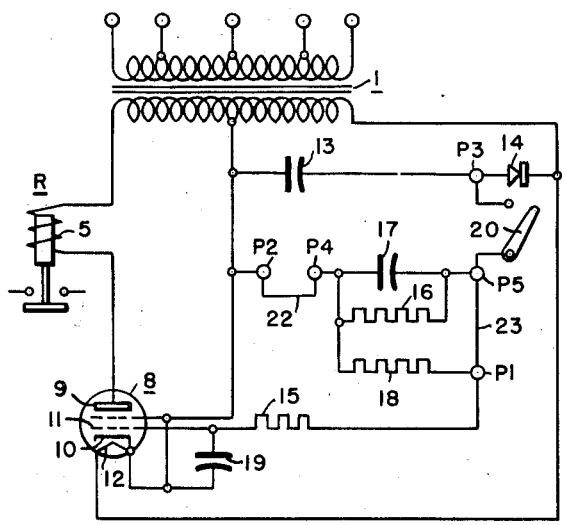
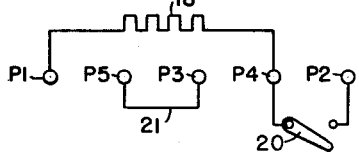
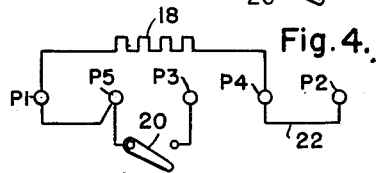
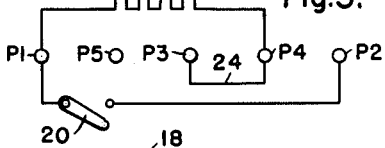
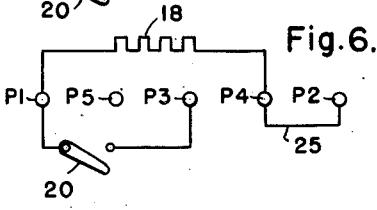
WITNESSES:
INVENTOR
John M. Cochran.
BY
ATTORNEY Patented Aug. 26, 1952

2,608,653

UNITED STATES PATENT OFFICE 2,608,653

ELECTRONIC LOW-ENERGY RELAY APPARATUS

John M. Cochran, Buffalo, N. Y., assignor to Westinghouse Electric Corporation, East Pittsburgh, Pa., a corporation of Pennsylvania Application February 25, 1950, Serial No. 146,366

14 Claims. (Cl. 250—27)

My invention relates to an electronic relay system for controlling an electromagnetic contactor or the like electric device and is applicable, for instance, as a low-energy relay for stopping the drive motor of textile or other fabricating machinery in response to a thread break or other faulty operating condition. Such relay systems are disclosed in the copending application Serial No. 794,518, filed December 30, 1947, of F. D. Snyder, now abandoned, assigned to the assignee of the present invention; and my invention is an improvement over relay systems according to the just-mentioned application.

In relay systems according to the above-mentioned application, the opening of a control switch, such as a drop wire contact responsive to the break of a thread in textile machinery, causes a capacitive circuit to control an electronic tube which causes an electro-magnetic contactor to drop out or to pick up depending upon a preselected circuit connection between accessible terminals of the capacitive control circuit. A period of delay elapses between the opening of the control switch and the response of the controlled contactor, this period being determined by the selected parameters of the capacitive tube control circuit. In a relay system as disclosed in the application, the period of delay when the circuit is set for controlled pick-up of the contactor is considerably different from the delay period occurring when the selective circuit connections of the same system are adapted for controlled drop-out of the contactor. For a typical set of circuit parameters, for instance, the time delay for controlled pick-up of the contactor may amount to 0.84 seconds, while the delay for controlled drop-out under otherwise the same conditions then amounts to 2.14 seconds. This difference limits the applicability of such systems and makes it infeasible to obtain optimum performance independent of the selected manner of operation.

It is, therefore, an object of my invention to provide a relay system of the above-mentioned kind in which the difference in time delays is considerably reduced or which operates with approximately equal periods of time delay for pickup and drop-out of the contactor or other controlled device.

Another object of my invention is to make such a system more versatile as regards the possibilities of selective timing performance obtainable simply by a change in connections between the accessible terminals of the capacitive tube control circuit.

While the means by virtue of which my invention achieves these objects are pointed out with particularity in the annexed claims, these means will be more fully apparent from the following description in conjunction with the appertaining drawing, in which:

Figure 1 shows the circuit diagram of a low-energy relay system according to the invention set for energizing an electromagnetic contactor when a control switch closes (delayed drop-out);

Fig. 2 shows the circuit diagram of part of the same relay system but set for deenergizing the contactor when the control switch closes (delayed pick-up), while Figs. 3 to 6 show schematically the accessible terminals of the same relay system in four selective connections for respectively different ways of operation, the connections shown in Figs. 3 and 4 being identical with those of Figs. 1 and 2, respectively.

According to Fig. 1, the illustrated relay circuit is energized from a transformer 1 whose primary winding 2 is preferably tapped for the selective connection to lines of 115, 230, 460 or 575 volts. The transformer has two secondary windings 3 and 4 which are series connected to each other and have a common intermediate terminal. Winding 3 provides a relatively high voltage (for instance, 195 volts). Winding 4 provides a low voltage (for instance, 6.3 volts). It will be understood that the numerical values just mentioned as well as those given hereinafter are presented only by way of example and may be modified in accordance with the requirements or desiderata of each particular application.

The device to be controlled is an electromagnetic relay R whose coil is denoted by 5 (115 volts half-wave D. C.). Relay R may form the controlling part of a stop motion device for arresting the drive motor of textile or other fabricating machinery in response to a thread break or the like fault.

The supply of current from high voltage winding 3 to coil 5 is controlled by an electronic trigger tube 8, for instance, a thyratron, whose anode is denoted by 9 and whose cathode and control electrode are denoted by 10 and 11, respectively. The cathode heater 12 of tube 8 is connected across the low-voltage winding 4. The plate circuit of tube 8 is connected in series with coil 5 of relay R across the high-voltage winding 3 so that the cathode 10 is attached to the intermediate terminal of the transformer secondaries.

Across the low-voltage winding 4 are placed a capacitor 13 (8 mfd.) and a rectifier 14 preferably of the barrier-layer type in series relation to each other. The rectifier 14 is poled so that the positive terminal of capacitor 13 is in connection with the intermediate terminal of the transformer secondaries and with the cathode 10. The capacitor 13 is normally charged and hence represents a source of a unidirectional bias voltage. The grid electrode 11 of tube 8 is connected through a resistor 15 (150,000 ohms) to a terminal P1. The cathode lead of tube 8 is connected to a terminal P2. A circuit point between capacitor 13 and rectifier 14 is connected to a terminal P3, and a resistor 16 (150,000 ohms) is connected in parallel with a capacitor 17 (8 mfd.) between terminals P4 and P5. A resistor 18 (100,000 ohms) is series-connected between terminals P1 and P4. A grid-cathode capacitor is denoted by 19.

According to Figs. 1 and 3, a contact 20 is connected across terminals P4 and P2. This contact may consist of the drop-wire switch or other fault-responsive control element of the above-mentioned fabricating machinery and is assumed to be open as long as the thread or strand element to be supervised by this particular contact is in good condition. A jumper 21 (Figs. 1 and 3) is connected between terminals P3 and P5. The terminals P1, P2, P3, P4, P5 are accessible and disposed close to one another to permit making or changing the contact and jumper connections as will be explained in the following.

The tube 8 is normally non-conductive so that coil 5 of relay R remains deenergized. This is due to the fact that, with the contact and jumper connections shown in Figs. 1 and 3, the control grid 11 of tube 8 is connected through resistors 15, 18, 16 and jumper 21 to the negative side of capacitor 13 which causes the grid to remain negative with respect to the cathode 10, so that the tube 8 cannot fire. However, if, due to the occurrence of a fault, the contact 20 closes, the charge of capacitor 13 is dumped into the capacitor 17. The terminal P4 assumes the same potential as the cathode 10. As a result, the tube 8 fires and the relay R picks up. Even though the contact 20 may be closed only for an extremely short period of time, the charge picked up by capacitor 17 remains effective for a relatively long period depending upon the rating of the capacitor discharge resistor 16. Hence the tube 8 remains firing for a period which is independent of the closing interval of the switch 20 and adjusted to be long enough for securing a safe response of the electromagnetic relay R. This relay, therefore, will always perform the desired protective operation, for instance, it will release the contactor of the drive motor so that the fabricating machinery is stopped.

If the contact and jumper connections between terminals P1, P2, P3, P4, P5 are changed in accordance with Figs. 2 and 4, the control contact 20 is connected between terminals P3 and P5. That is, the contact now takes the place of the jumper 21 of Fig. 1 and a jumper 22 is connected between terminals P2 and P4. Another jumper 23 now interconnects the terminals P1 and P5. With these terminal connections, the operation of the relay is reversed so that now the grid 11 of tube 8 is normally at the cathode potential. Consequently, the tube 8 remains conductive and the relay R is normally energized until such time as the control contact 20 is momentarily closed. When this happens, the grid 11 becomes negative and causes the tube to cease firing for a period long enough to permit the relay R to drop out.

As mentioned, a delay period ($t_1$) elapses between the opening moment of control contact 20 and the occurrence of deenergization of relay R during performance with the setting of Figs. 1 and 3; and there is another timing period ($t_2$) between the opening of contact 20 and the energization of relay R with the setting of Figs. 2 and 4. The delay periods $t_1$ and $t_2$ depend upon the parameters of the tube control circuit:

$$t_1 = R_1 C_2 \operatorname{Log}_E \frac{E^0}{E^0 - V_f}$$

$$t_2 = \left(\frac{R_1 R_2}{R_1 + R_2}\right) C_2 \operatorname{Log}_E \frac{E^0}{V_f}$$

wherein $R_1$ = resistance of resistor 16,
$R_2$ = resistance of resistor 18,
$C_2$ = capacitance of capacitor 17,
$E^0$ = voltage across capacitor 13 when capacitor 17 is fully charged,
$V_f$ = critical grid voltage of tube 8.

It will be noted that in the circuit of Fig. 1 the resistor 18 lies in series with the grid resistor 15 and has no effect on the time delay of the circuit, while in the circuit of Fig. 2 the resistor 18 lies parallel to resistor 16 across the capacitor 17 and hence affects the time delay. This difference is apparent from the above-presented equations. It follows that:

$$\frac{t_2}{t_1} = \frac{R_2}{R_1 + R_2} \cdot \frac{\operatorname{Log}_E \frac{E^0}{V_f}}{\operatorname{Log}_E \frac{E^0}{E^0 - V_f}}$$

Therefore, when the values of resistances $R_1$ and $R_2$ are so chosen that $$\frac{R_1 + R_2}{R_2} = \frac{\operatorname{Log}_E \frac{E^0}{V_f}}{\operatorname{Log}_E \frac{E^0}{E^0 - V_f}}$$

the value of $$\frac{t_2}{t_1}$$

becomes unity, i. e. $t_2 = t_1$.

Thus, by properly selecting the resistance values $R_1$ (of resistor 16) and $R_2$ (of resistor 18), the two time delays $t_1$ and $t_2$ can be made approximately equal. For example, if $E^0 = 8$ volts and $V_f = 2.75$ volts, a choice of 150,000 ohms for resistor 16 and 100,000 ohms for resistor 18 results in $$\frac{t_2}{t_1} = 1.02$$

and $t_2$ is approximately equal to $t_1$. With the circuit parameters as exemplified in the foregoing description of Fig. 1, $t_1$ and $t_2$ are about ½ second.

Relay systems according to the invention have the further advantage of permitting an increased variety of applications without increase in terminal connection points. For instance, Figs. 5 and 6 show two additional possibilities of terminal connections. The jumper connections in Figs. 5 and 6 are denoted by 24 and 25. With the connections of Fig. 5, the relay R is deenergized when the control contact 20 is open, and the relay R is energized when contact 20 is closed, no time delay occurring in either operation. With the connections of Fig. 6, the relay R is energized when contact 20 is open and deenergized when contact 20 is closed, with no time delay in either operation. Still another performance is obtained when the jumper and contact connection of Fig. 4 is chosen but the resistor 18 removed. Then the relay R picks up when contact 20 opens but with an increased time delay of about 1½ seconds instead of the ½ second delay otherwise obtaining.

Relay systems according to the invention have an extremely low energy consumption so that the invention is especially advantageous for applications, such as with textile machinery, where a large number of relay circuits are required and are to remain ready for response during long periods of time. In such multiple relay combinations only one transformer, with only two secondary windings as illustrated in Fig. 1, is sufficient as a voltage source for all relay circuits.

I claim as my invention:

1. A relay apparatus, comprising an alternating-current supply device having a high voltage section and a low voltage section, an electric circuit member to be controlled, an electronic relay tube, having a cathode and an anode series-connected with said member across said high voltage section and having a grid for controlling the current conduction of said tube to thus control the operation of said member, five terminals accessible and selectively interconnectable for adapting the apparatus to different control operations, a first one of said terminals being connected with said grid, said two sections having a common circuit point connected with a second one of said terminals, a first capacitor and a rectifier connected in series with each other across said low voltage section and having a common intermediate point connected with a third one of said terminals, a second capacitor and a first resistor connected parallel to each other between the fourth and fifth terminals, and a second resistor connected between said first and fourth terminals.

2. A relay apparatus, comprising an alternating-current supply device having a high voltage section and a low voltage section, an electric circuit member to be controlled, an electronic relay tube, having a cathode and an anode series-connected with said member across said high voltage section and having a grid for controlling the current conduction of said tube to thus control the operation of said member, a first terminal connected with said grid, said two sections having in common a second terminal, a capacitor and a rectifier connected in series with each other across said low voltage section and having in common an intermediate third terminal, a fourth terminal and a fifth terminal, a capacitor and a resistor connected parallel to each other between said fourth and fifth terminals, another resistor connected between said first and fourth terminals, a control contact which, when the apparatus is in operative condition, is series connected with said circuit means between said second and fourth terminals and jumper means attachable to connect said third terminal to said fifth terminal.

3. A relay apparatus, comprising an alternating-current supply device having a high voltage section and a low voltage section, an electric circuit member to be controlled, an electronic relay tube, having a cathode and an anode series-connected with said member, including a winding the energization of which is across said high voltage section and having a grid for controlling said member, five terminals accessible and selectively interconnectable for adapting the apparatus to different control operations, a first one of said terminals being connected with said grid, said two sections having a common circuit point connected with a second one of said terminals, a first capacitor and a rectifier connected in series with each other across said low voltage section and having a common intermediate point constituting a third one of said terminals, a second capacitor and a first resistor connected parallel to each other between the fourth and fifth terminals, a second resistor connected between said first and fourth terminals, a grid resistor series interposed between said first terminal and said grid, said first and second resistors having respective resistance values different from each other but of about the same order of magnitude.

4. In apparatus according to claim 1, said first and second resistors having respective resistance values related to each other in approximate accordance with the equation $$\frac{R_1+R_2}{R_2}=\frac{\operatorname{Log}_E \frac{E^0}{V_f}}{\operatorname{Log}_E \frac{E^0}{E^0-V_f}}$$

wherein $R_1$ is the resistance value of said first resistor, $R_2$ the resistance value of said second resistor, $E^0$ the voltage across said first capacitor, and $V_f$ the critical grid voltage of said tube.

5. A relay apparatus, comprising a transformer having a high voltage winding and a low voltage winding with a common intermediate point, an electric circuit member, including a winding the energization of which is to be controlled, and an electronic relay tube, having a cathode and an anode series connected with each other across said high voltage winding, said tube having a control grid, a first capacitor and a rectifier connected across said low voltage winding and having a common intermediate terminal, a control contact, a second capacitor and a first resistor connected parallel to each other and connected in series with said contact between said point and said terminal, a second resistor having one end attached to said second capacitor at the capacitor side connected to said point, said second resistor having at its other end a terminal connected with said grid, and jumper means for interconnecting said last named terminal to the second capacitor at the side opposite to the capacitor side connected to said point to then connect the two otherwise series related resistors in parallel relation to each other.

6. In apparatus according to claim 5, said first and second resistors having respective resistance values proportioned relative to each other in accordance with approximately equal time delays between actuation of said contact and response of said member when said resistors are series connected and parallel connected respectively.

7. A relay apparatus according to claim 1, comprising a control contact member connected between said second and fourth terminals and a jumper connected between said third and fifth terminals for delayed deenergization of said controlled circuit member when said contact member opens.

8. A relay apparatus according to claim 1, comprising a control contact member connected between said third and fifth terminals, a jumper connected between said second and fourth terminals, and another jumper connected between said first and fifth terminals for delayed energization of said controlled circuit member upon opening of said contact member.

9. In relay apparatus, comprising an alternating current supply device including a transformer secondary winding having a relatively high voltage section and a relatively low voltage section, an electromagnetic device having a winding the energization of which is to be controlled, an electronic relay tube having an anode and a cathode series connected with said winding across said high voltage section and having a grid for controlling the current conduction of said tube to thus control the energization of said winding, a first terminal connected to said grid, said two sections having a common second terminal, a capacitor and a rectifier connected in series with each other across said low voltage section and having in common an intermediate third terminal, a fourth terminal, and a fifth terminal, a capacitor and a resistor connected in parallel to each other between said fourth and fifth terminals, another resistor connected between said first and fourth terminals, a control contact which, when the apparatus is in operation, is series connected between said third and fifth terminals, and jumper means attachable to said second and fourth terminals.

10. In relay control apparatus, in combination, an alternating current supply device having a high voltage section and a low voltage section and a common connecting point, an electromagnetic device having a winding the energization of which is to be controlled, an electronic tube having an anode and a cathode, said tube and electromagnetic device being connected in series across the said high voltage section, a control grid for the electronic tube connected, five terminals accessible and selectively interconnectable for adapting the apparatus to the same control operation for different conditions of energization of the apparatus, a first one of said terminals being connected to the grid, said common connecting point being connected to a second one of said terminals, a first capacitor and a rectifier connected in series, through a third one of said terminals, across the low voltage section, a second capacitor and first control resistor connected in parallel to each other between the fourth terminal and the fifth terminal, a second control resistor connected between the said fourth terminal and the said first terminal, and means for selectively connecting the said first terminal to the said fifth terminal, the third terminal to the fifth terminal, and the second terminal to the fourth terminal.

11. In relay control apparatus, in combination, an alternating current supply device having a high voltage section and a low voltage section and a common connecting point, an electromagnetic device having a winding the energization of which is to be controlled, an electronic tube having an anode and a cathode, said tube and electromagnetic device being connected in series across the said high voltage section, a control grid for the electronic tube connected, five terminals accessible and selectively interconnectable for adapting the apparatus to the same control operation for different conditions of energization of the apparatus, a first one of said terminals being connected to the grid, said common connecting point being connected to a second one of said terminals, a first capacitor and a rectifier connected in series, through a third one of said terminals, across the low voltage section, a second capacitor and first control resistor connected in parallel to each other between the fourth terminal and the fifth terminal, a second control resistor connected between the said fourth terminal and the said first terminal, and means for connecting the first terminal to the fifth terminal and the third terminal to the fifth terminal.

12. In a relay control apparatus, in combination, an alternating current supply device having a high voltage section and a low voltage section and a common connecting point, an electromagnetic device having a winding the energization of which is to be controlled, an electronic tube having an anode and a cathode, said tube and electromagnetic device being connected in series across the said high voltage section, a control grid for the electronic tube connected, five terminals accessible and selectively interconnectable for adapting the apparatus to the same control operation for different conditions of energization of the apparatus, a first one of said terminals being connected to the grid, said common connecting point being connected to a second one of said terminals, a first capacitor and a rectifier connected in series, through a third one of said terminals, across the low voltage section, a second capacitor and first control resistor connected in parallel to each other between the fourth terminal and the fifth terminal, a second control resistor connected between the said fourth terminal and the said first terminal, and means for connecting the first terminal to the fifth terminal and the second terminal to the fourth terminal.

13. In relay control apparatus, in combination, an alternating current supply device having a high voltage section and a low voltage section and a common connecting point, an electromagnetic device having a winding the energization of which is to be controlled, an electronic tube having an anode and a cathode, said tube and electromagnetic device being connected in series across the said high voltage section, a control grid for the electronic tube connected, five terminals accessible and selectively interconnectable for adapting the apparatus to the same control operation for different conditions of energization of the apparatus, a first one of said terminals being connected to the grid, said common connecting point being connected to a second one of said terminals, a first capacitor and a rectifier connected in series, through a third one of said terminals, across the low voltage section, a second capacitor and first control resistor connected in parallel to each other between the fourth terminal and the fifth terminal, a second control resistor connected between the said fourth terminal and the said first terminal, and means for connecting the second terminal to the fourth terminal and the third terminal to the fifth terminal.

14. In relay control apparatus, in combination, an alternating current supply device having a high voltage section and a low voltage section and a common connecting point, an electromagnetic device having a winding the energization of which is to be controlled, an electronic tube having an anode and a cathode, said tube and electromagnetic device being connected in series across the said high voltage section, a control grid for the electronic tube connected, five terminals accessible and selectively interconnectable for adapting the apparatus to the same control operation for different conditions of energization of the apparatus, a first one of said terminals being connected to the grid, said common connecting point being connected to a second one of said terminals, a first capacitor and a rectifier connected in series, through a third one of said terminals, across the low voltage section, a second capacitor and a first control resistor connected in parallel with each other between the fourth terminal and the fifth terminal, a second control resistor connected between the fourth terminal and the first terminal, a jumper connection between the third terminal and the fifth terminal, and a contact connection disposed between the second terminal and the fourth terminal for connecting and disconnecting the second and fourth terminals depending on the operation of the contact connection.

JOHN M. COCHRAN.

REFERENCES CITED

The following references are of record in the file of this patent:

UNITED STATES PATENTS

| Number | Name | Date |
|---|---|---|
| 2,364,680 | Wolfner | Dec. 12, 1944 |
| 2,463,318 | Schneider | Mar. 1, 1949 |
| 2,471,834 | McDowell | May 31, 1949 |